United States Patent
Chen

(10) Patent No.: US 9,327,800 B2
(45) Date of Patent: May 3, 2016

(54) SPINDLE STRUCTURE FOR A PEDAL

(71) Applicant: Chung-I Chen, Taichung (TW)

(72) Inventor: Chung-I Chen, Taichung (TW)

( * ) Notice: Subject to any disclaimer, the term of this patent is extended or adjusted under 35 U.S.C. 154(b) by 0 days.

(21) Appl. No.: 14/042,620

(22) Filed: Sep. 30, 2013

(65) Prior Publication Data

US 2015/0090072 A1    Apr. 2, 2015

(51) Int. Cl.
*B62M 3/08* (2006.01)

(52) U.S. Cl.
CPC .............. *B62M 3/08* (2013.01); *Y10T 74/2168* (2015.01)

(58) Field of Classification Search
CPC .......... B62M 3/08; B62M 3/10; B62M 3/083; B62M 3/086; Y10T 74/2168; Y10T 74/2169; Y10T 74/217; Y10T 74/2172
USPC ................................ 74/594.4–594.7; 36/131
See application file for complete search history.

(56) References Cited

U.S. PATENT DOCUMENTS

| 1,254,610 | A | * | 1/1918 | Ledig | 74/594.4 |
| 3,485,113 | A | * | 12/1969 | Adcock | 74/594.4 |
| 3,807,255 | A | * | 4/1974 | Baginski | 74/594.4 |

FOREIGN PATENT DOCUMENTS

FR    2549000 A1 *  1/1985    ............... B62M 3/08

* cited by examiner

*Primary Examiner* — Thomas Diaz

(57) ABSTRACT

A spindle structure for a pedal includes a pedal body having a through hole formed from one end thereof to another end thereof, two ends of the through hole respectively defined as a first end opening and a second end opening; and a spindle body assembled on the pedal body, the spindle body having an insert portion and a threaded portion respectively defined at two ends thereof, the insert portion inserted into the through hole of the pedal body, a tip portion of the insert portion defined as a positioning portion, a periphery of the positioning portion gradually widened toward the second end opening, the threaded portion exposed from the first end opening, the positioning portion exposed from the second end opening.

4 Claims, 6 Drawing Sheets

SPINDLE STRUCTURE FOR A PEDAL

BACKGROUND OF THE INVENTION

1. Field of the Invention

The present invention relates to a spindle structure and more particularly to a spindle structure for a pedal.

2. Description of Related Art

A conventional bicycle pedal comprises a pedal body and a central shaft. The central shaft is rotatable relative to the pedal body. The central shaft has a connecting end defined at one end thereof. A plurality of threaded grooves is defined around an outer periphery of the connecting end, so that the connecting end is threaded with a crank of a bicycle. The central shaft has a terminal end defined at another end thereof. A threaded hole is opened through the terminal end. A bolt is threaded with the threaded hole so that the pedal body is restricted by the bolt and does not depart from the central shaft.

However, the conventional bicycle pedal has some disadvantages described as following.

In order to produce the threaded hole at the terminal end of the central shaft, the manufacturer has to apply a hole opening procedure and a threading procedure to the central shaft; moreover, in order to avoid from the pedal body departing from the central shaft, another procedure, namely, to threaded the bolt with the threaded hole is further applied. Under such condition, the production of the conventional bicycle pedal costs money and takes time.

Furthermore, another conventional bicycle pedal is achieved by applying an external force at the terminal end of the central shaft so as to expand the terminal end of the central shaft for restricting said bicycle pedal; however, in order to enhance the structural strength of the central shaft, a heat treatment procedure is applied to the central shaft, and the method, apply an external force at the terminal end of the central shaft, is only applicable to the central shaft without the heat treatment procedure.

The present invention has arisen to mitigate and/or obviate the disadvantages of the conventional.

SUMMARY OF THE INVENTION

The main objective of the present invention is to provide an improved spindle structure.

To achieve the objective, a spindle structure for a pedal comprises a pedal body having a through hole formed from one end thereof to another end thereof, two ends of the through hole respectively defined as a first end opening and a second end opening; and a spindle body assembled on the pedal body, the spindle body having an insert portion and a threaded portion respectively defined at two ends thereof, the insert portion inserted into the through hole of the pedal body, a tip portion of the insert portion defined as a positioning portion, a periphery of the positioning portion gradually widened toward the second end opening, the threaded portion exposed from the first end opening, the positioning portion exposed from the second end opening. Wherein, the spindle structure for a pedal further comprises a first sleeve assembled on the first end opening, a second sleeve assembled on the second end opening, the first sleeve having a first flange, the second sleeve having a second flange, the first flange of the first sleeve abutting against the first end opening, the second flange of the second sleeve abutting against the second end opening, the first sleeve and the second sleeve mounted around the insert portion, a ring mounted around the insert portion, the ring located between the positioning portion and the second flange of the second sleeve, a cap assembled at the second end opening, so as to protect the positioning portion and the second sleeve. In addition, a top side and a bottom side of the pedal body are defined as two platforms; each platform has a plurality of anti-slip members assembled thereon.

Further benefits and advantages of the present invention will become apparent after a careful reading of the detailed description with appropriate reference to the accompanying drawings.

DETAILED DESCRIPTION OF THE INVENTION

Figure 1:
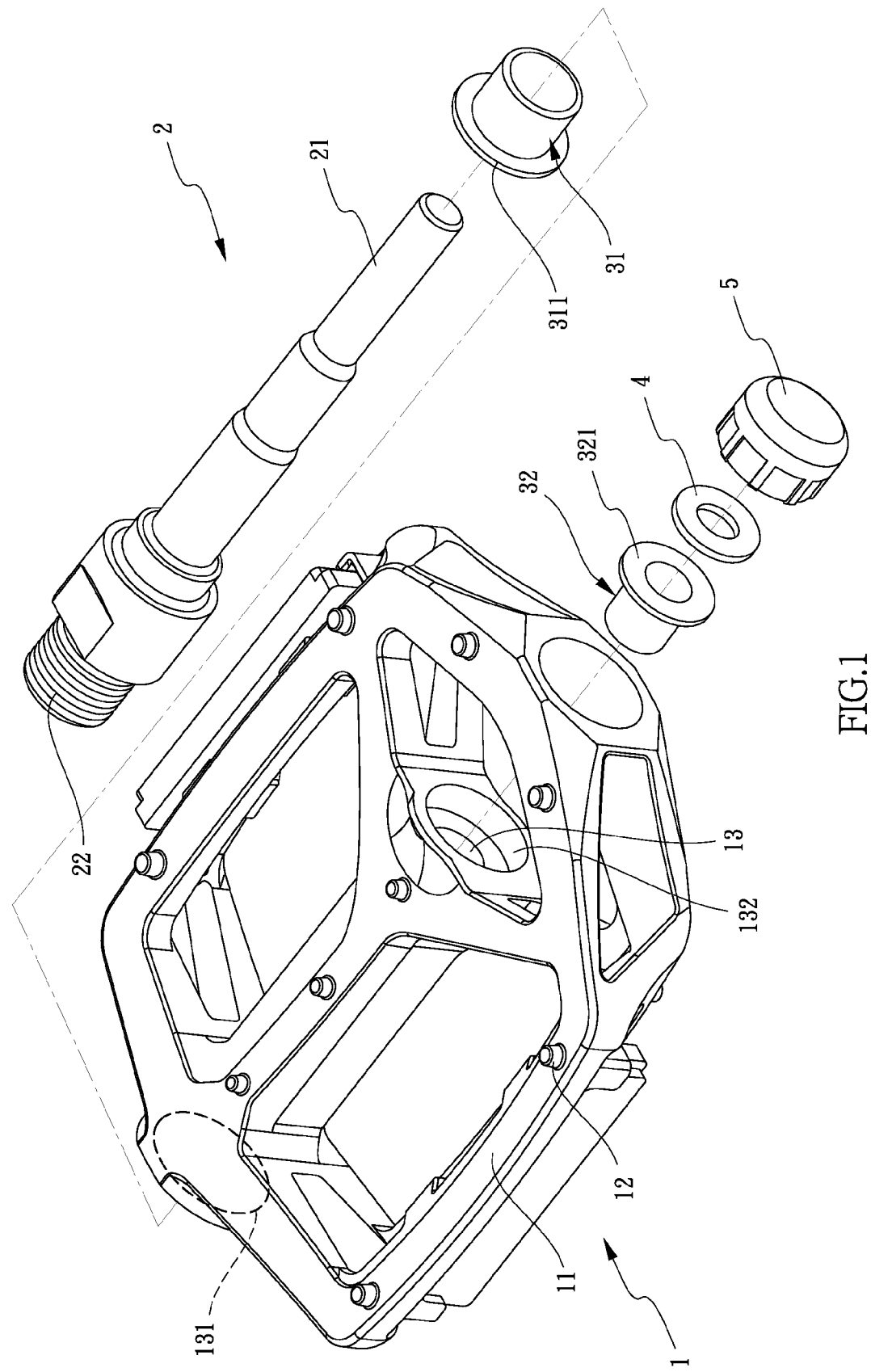
FIG. 1 is an exploded view of the present invention.
Figure 2:
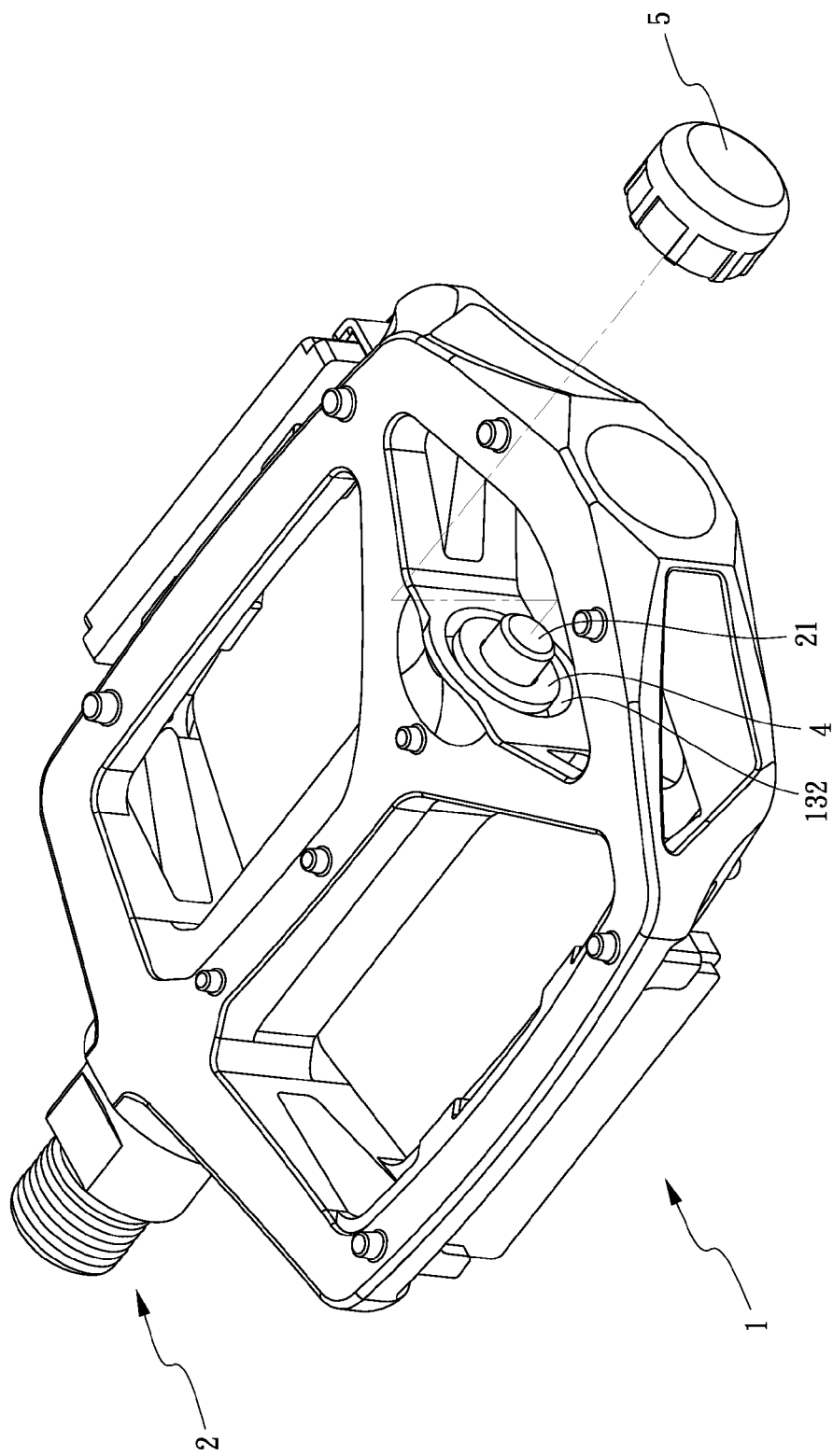
FIG. 2 is a perspective view of the present invention.
Figure 3:
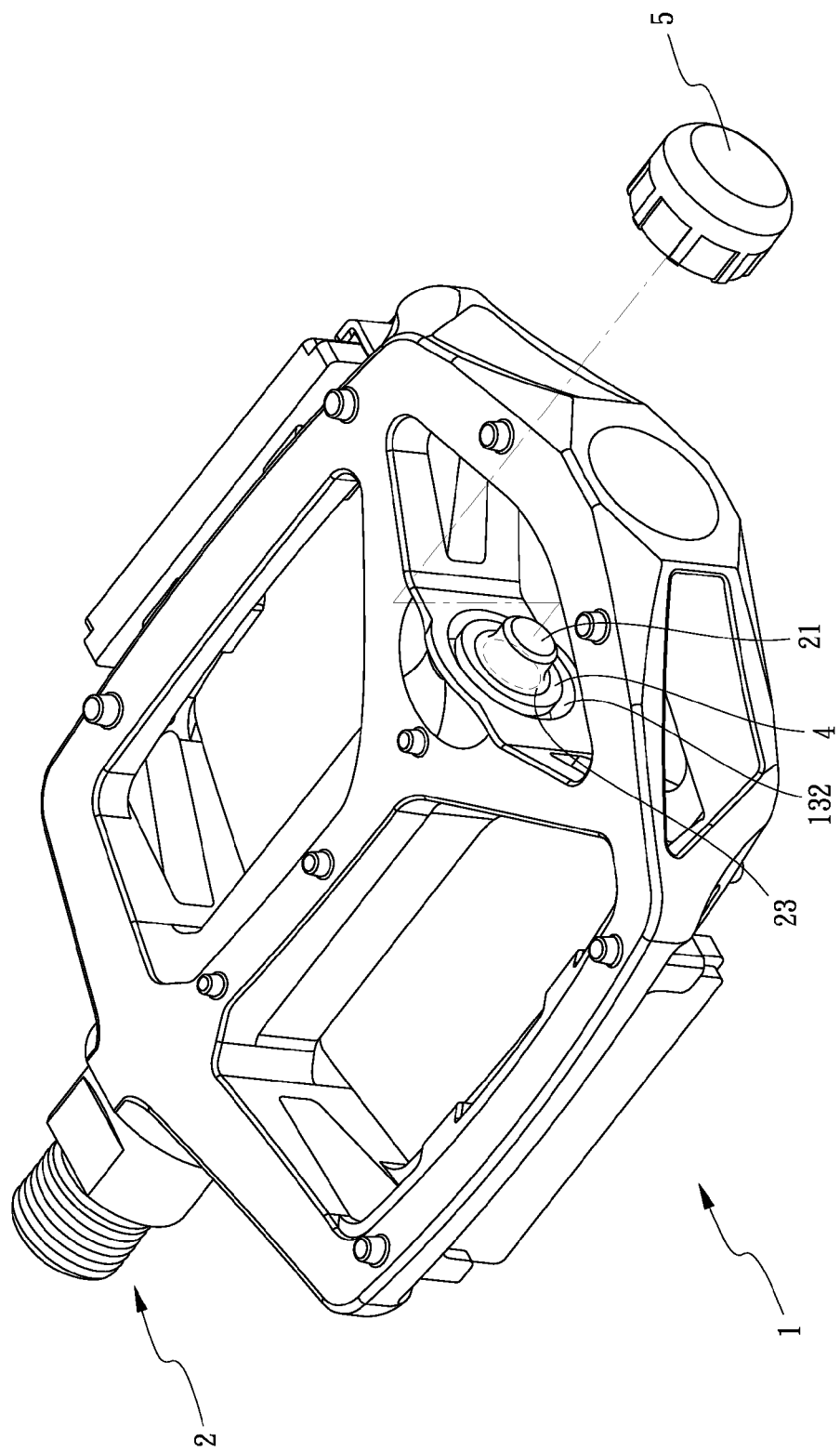
FIG. 3 is a perspective view for showing a positioning portion.
Figure 4:
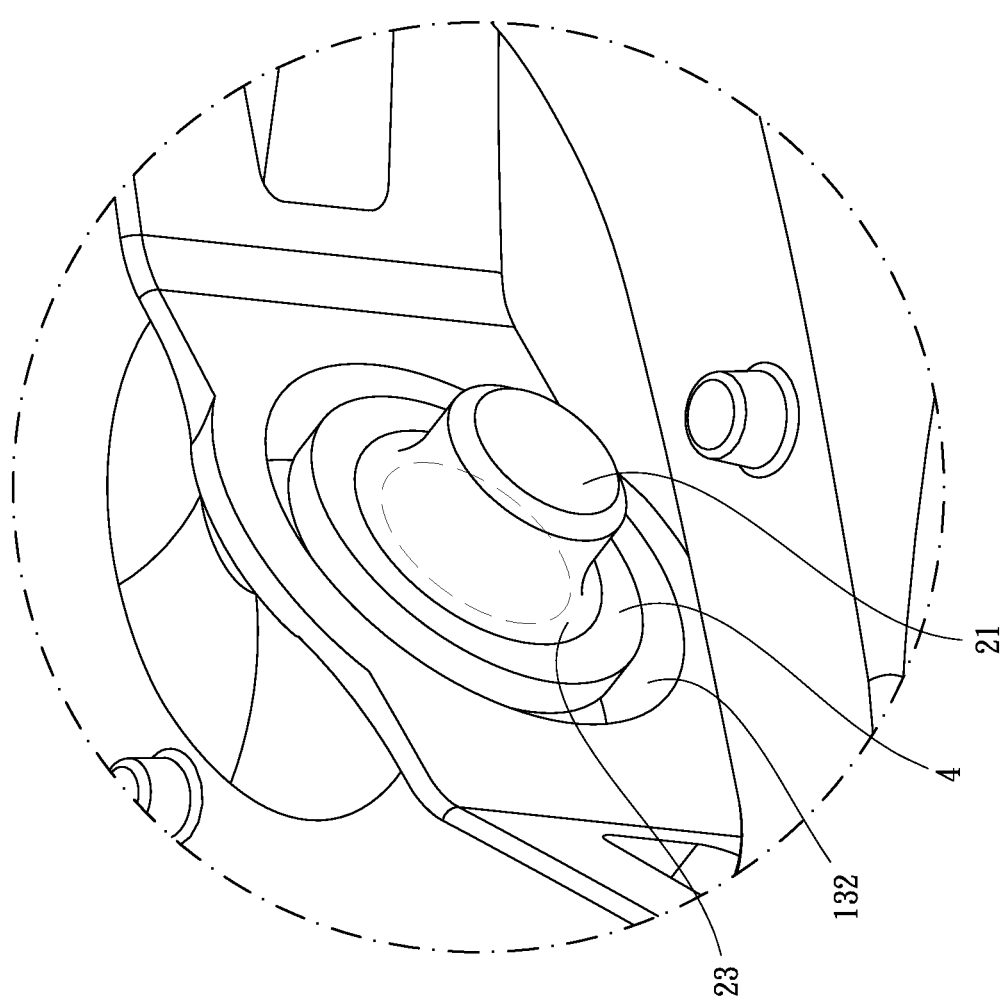
FIG. 4 is an enlarged view for showing the positioning portion.
Figure 5:
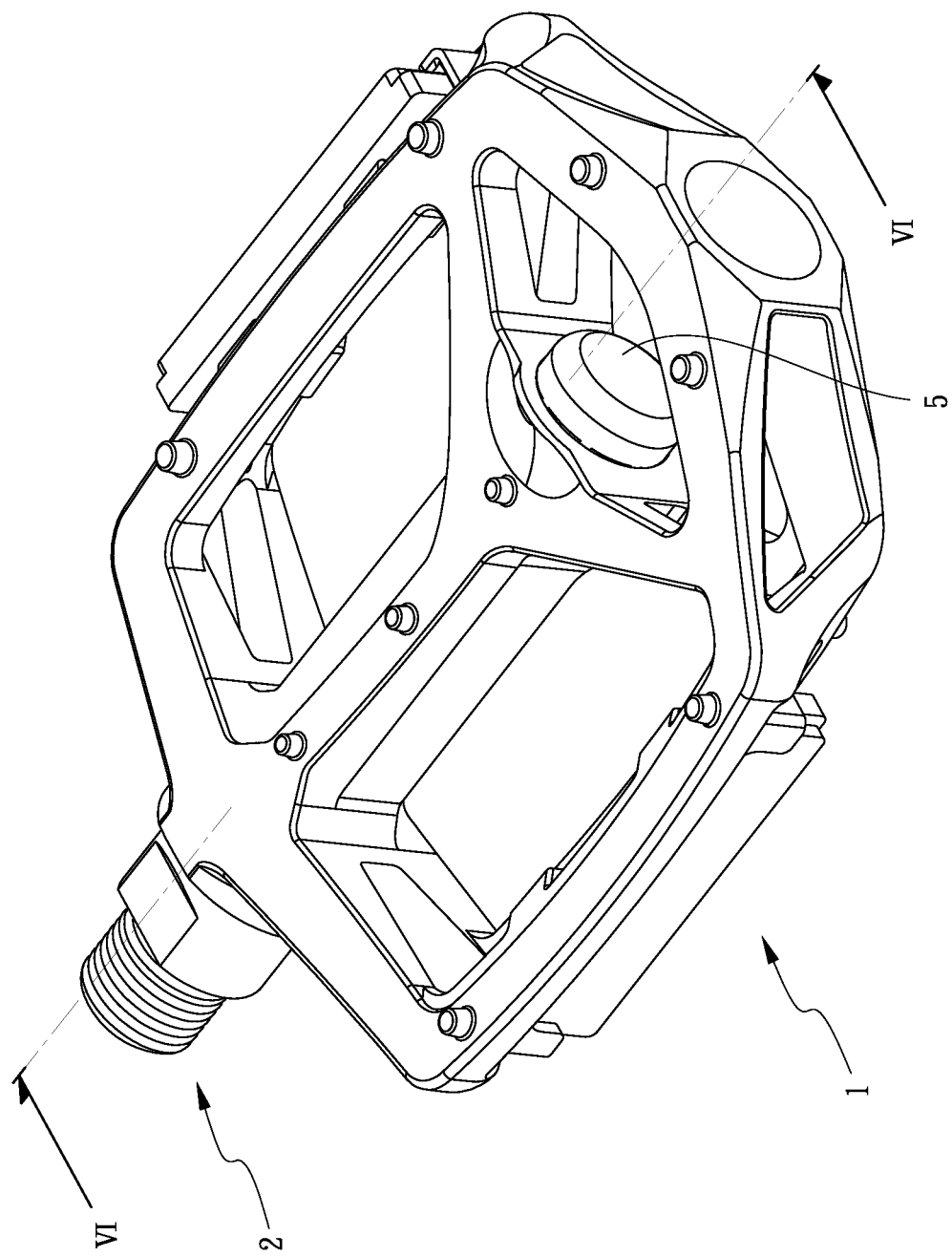
FIG. 5 is an assembled view of the present invention.
Figure 6:
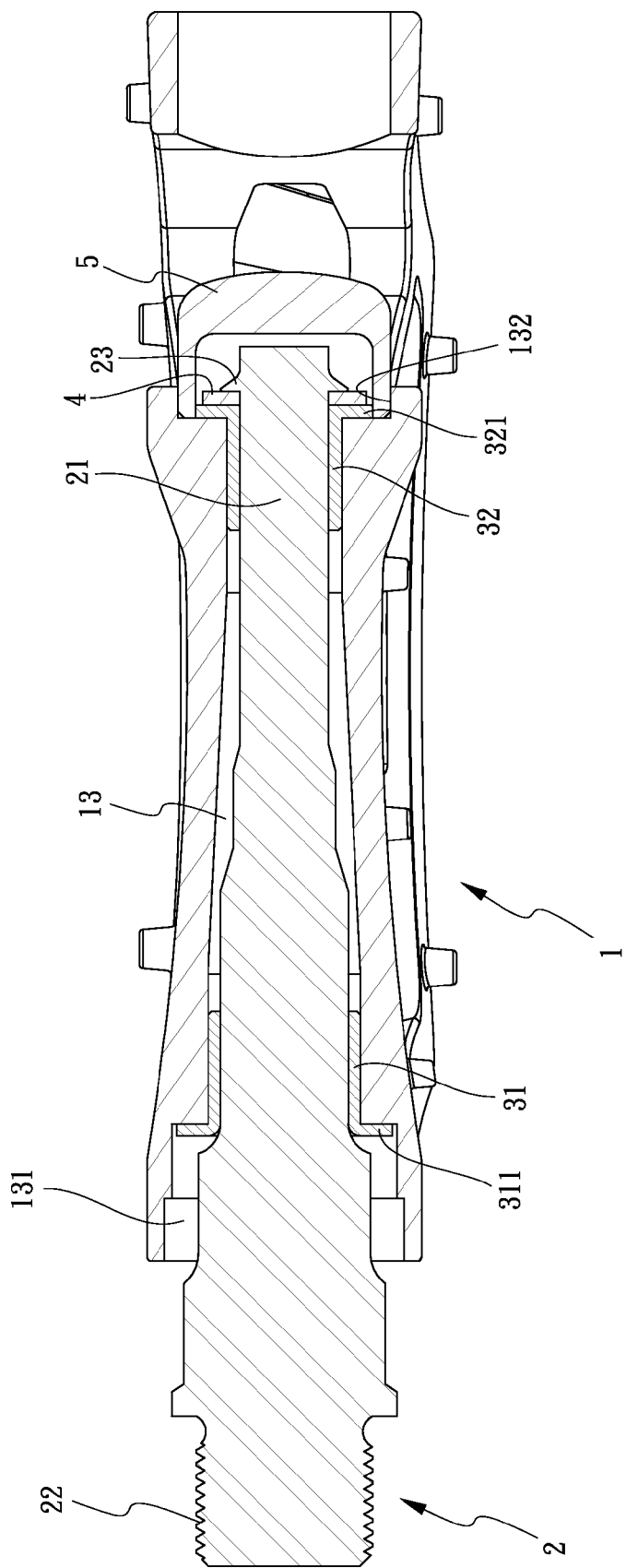
FIG. 6 is a cross-sectional view along line VI-VI of FIG. 5.

Referring to FIGS. 1-5, a spindle structure for a pedal in accordance with the present invention comprises a pedal body 1 and a spindle body 2. The spindle body 2 is assembled on the pedal body 1. A top side and a bottom side of the pedal body 1 are defined as two platforms 11. Each platform 11 has a plurality of anti-slip members 12 assembled thereon. The anti-slip members 12 are spaced from each other. One end of each anti-slip member 12 is assembled on each corresponding platform 11. Another end of each anti-slip member 12 is extended away from each corresponding platform 11. A through hole 13 is formed from one end of the pedal body 1 to another end of the pedal body 1. Two ends of the through hole 13 are respectively defined as a first end opening 131 and a second end opening 132. The first end opening 131 faces a crank of a bicycle (not shown). A first sleeve 31 is assembled on the first end opening 131. A second sleeve 32 is assembled on the second end opening 132. The first sleeve 31 has a first flange 311 formed at one end thereof. The second sleeve 32 has a second flange 321 formed at one end thereof. The first flange 311 of the first sleeve 31 abuts against the first end opening 131. The second flange 321 of the second sleeve 32 abuts against the second end opening 132. The pedal body 1 is BMX type (bicycle motocross type). The spindle body 2 has an insert portion 21 defined at one end thereof. The spindle body 2 has a threaded portion 22 defined at another end thereof. The insert portion 21 is inserted into the through hole 13 of the pedal body 1. The threaded portion 22 is exposed from the first end opening 131 of the through hole 13. The threaded portion 22 is screwed to the crank, so as to connect the spindle body 2 to the crank (not shown). The first sleeve 31 is mounted around the insert portion 21 at the first end opening 131. The second sleeve 32 is mounted around the insert portion 21 at the second end opening 132. A ring 4 is mounted around the insert portion 21 outside of the second end opening 132. A tip portion of the insert portion 21, which is extended from the ring 4, is defined as a positioning portion 23 via compression molding. The positioning portion 23 is exposed from the second end opening 132. The ring 4 is located between the positioning portion 23 and the second flange 321 of the second sleeve 32. A periphery of the positioning portion 23 is gradually widened toward the second end opening 132. A cap 5 is assembled at the second end opening 132, so as to protect the positioning portion 23, the second sleeve 32 and the ring 4.

Therefore, the pedal body 1 is prevented from axially moving relative to the spindle body 2, because of the positioning portion 23, the second sleeve 32 and the ring 4; the pedal body 1 is rotatable relative to the spindle body 2. All in all, the present invention is easy to assemble and is at a low cost.

Although the invention has been explained in relation to its preferred embodiment, it is to be understood that many other possible modifications and variations can be made without departing from the spirit and scope of the invention as hereinafter claimed.

What is claimed is:

1. A pedal comprising:
a pedal body formed with a through hole extending from one end thereof to another end thereof, two ends of the through hole, respectively, being defined as a first end opening and a second end opening;
a sleeve formed with a flange and disposed at the second end opening of the pedal body;
a ring disposed at the second end opening of the pedal body in proximity to the flange of the sleeve; and
a spindle body firmed in one piece and assembled on the pedal body, the spindle body having an insert portion defined at one end of said spindle body, and a threaded portion defined at another end of said spindle body opposite to said insert portion, the insert portion having a uniformly contoured smooth surface along substantially an entire length thereof, said insert portion being inserted into the through hole of the pedal body and passing through the sleeve and the ring, wherein the insert portion has a tip portion defined as a positioning portion and extending outside the ring, said tip portion having an outermost portion and an abutting portion spaced one from another, wherein a periphery of said tip portion has a sloped profile defined between said outermost and abutting portions, said sloped profile of the tip portion being widened toward the ring at said abutting portion, wherein said abutting portion has an external diameter exceeding the diameter of said insert portion along substantially the entire length thereof, and wherein said abutting portion of said tip portion is disposed in contact with and resting upon the ring to prevent the spindle body from displacement toward said first end opening, wherein the threaded portion is exposed from the first end opening, and the positioning portion is exposed from the second end opening.

2. The pedal as claimed in claim 1, further comprising another sleeve assembled on the first end opening, the another sleeve having a flange, the flange of the another sleeve abutting against the first end opening, and the another sleeve mounted around the insert portion of the spindle body.

3. The pedal as claimed in claim 2, further comprising a cap assembled at the second end opening, so as to protect the positioning portion and the second sleeve.

4. The pedal as claimed in claim 1, wherein a top side and a bottom side of the pedal body are defined as two platforms; each platform has a plurality of anti-slip members assembled thereon.

* * * * *